(12) United States Patent
Cao et al.

(10) Patent No.: US 11,204,433 B2
(45) Date of Patent: Dec. 21, 2021

(54) STRIP PIXEL DETECTOR

(71) Applicant: SHENZHEN XPECTVISION TECHNOLOGY CO., LTD., Shenzhen (CN)

(72) Inventors: Peiyan Cao, Shenzhen (CN); Yurun Liu, Shenzhen (CN)

(73) Assignee: SHENZHEN XPECTVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/919,539

(22) Filed: Jul. 2, 2020

(65) Prior Publication Data

US 2020/0333481 A1 Oct. 22, 2020

Related U.S. Application Data

(63) Continuation of application No. PCT/CN2018/074048, filed on Jan. 24, 2018.

(51) Int. Cl.
| | | |
|---|---|---|
| *G01T 1/36* | (2006.01) | |
| *G01T 1/24* | (2006.01) | |
| *G01N 23/223* | (2006.01) | |

(52) U.S. Cl.
CPC .............. *G01T 1/366* (2013.01); *G01T 1/241* (2013.01); *G01T 1/247* (2013.01); *G01N 23/223* (2013.01)

(58) Field of Classification Search
CPC ......... G01T 1/366; G01T 1/241; G01T 1/247; G01N 23/223
USPC .......................................... 250/370.9, 370.09
See application file for complete search history.

(56) References Cited

U.S. PATENT DOCUMENTS

| | | | | |
|---|---|---|---|---|
| 2009/0060119 A1* | 3/2009 | Jupiter | ................. | G01N 23/046 378/2 |
| 2018/0017686 A1* | 1/2018 | Cao | ......................... | G01T 1/247 |
| 2018/0177481 A1* | 6/2018 | Jacob | .................... | G01N 23/046 |
| 2019/0064373 A1* | 2/2019 | Cao | .......................... | H04N 5/32 |
| 2019/0069859 A1* | 3/2019 | Cao | ........................ | G01T 1/2018 |
| 2019/0079202 A1* | 3/2019 | Cao | .......................... | G01T 1/247 |
| 2019/0094393 A1* | 3/2019 | Cao | ....................... | A61B 6/4233 |
| 2019/0094396 A1* | 3/2019 | Cao | ........................ | G06F 3/0608 |
| 2020/0013919 A1* | 1/2020 | Cao | ................... | H01L 31/02002 |
| 2020/0150288 A1* | 5/2020 | Cao | .......................... | G01T 1/241 |
| 2020/0150290 A1* | 5/2020 | Cao | .......................... | H04N 5/378 |
| 2020/0150291 A1* | 5/2020 | Cao | ................... | H01L 27/14625 |
| 2020/0249365 A1* | 8/2020 | Cao | .......................... | H02M 3/07 |
| 2020/0252561 A1* | 8/2020 | Cao | ....................... | G06T 7/0012 |

(Continued)

FOREIGN PATENT DOCUMENTS

| CN | 104779261 A | 7/2015 |
|---|---|---|
| CN | 107533146 A | 1/2018 |

(Continued)

OTHER PUBLICATIONS

PCT/CN2018/074048 ISA210 PCT ISR dated Oct. 23, 2018.

(Continued)

*Primary Examiner* — David P Porta
*Assistant Examiner* — Gisselle M Gutierrez
(74) *Attorney, Agent, or Firm* — IPro, PLLC; Qian Gu

(57) ABSTRACT

Disclosed herein is a detector, comprising: a plurality of strip pixels, wherein each of the strip pixel is configured to count numbers of radiation photons incident thereon whose energy falls in a plurality of bins, within a period of time.

16 Claims, 14 Drawing Sheets

(56) References Cited

U.S. PATENT DOCUMENTS

2020/0256992 A1* 8/2020 Cao .................... G01T 1/247
2020/0341157 A1* 10/2020 Cao .................... G01T 1/247

FOREIGN PATENT DOCUMENTS

CN 107615095 A 1/2018
WO 2017063157 A1 4/2017

OTHER PUBLICATIONS

Liu, Xuejin, et al. "A silicon-strip detector for photon-counting spectral CT: energy resolution from 40 keV to 120 keV." IEEE Transactions on Nuclear Science 61.3 (2014): 1099-1105.

* cited by examiner

STRIP PIXEL DETECTOR

TECHNICAL FIELD

The disclosure herein relates to a strip pixel detector suitable for detecting radiation such as X-ray and gamma ray.

BACKGROUND

X-ray fluorescence (XRF) is the emission of characteristic fluorescent X-rays from a material that has been excited by, for example, exposure to high-energy X-rays or gamma rays. An electron on an inner orbital of an atom may be ejected, leaving a vacancy on the inner orbital, if the atom is exposed to X-rays or gamma rays with photon energy greater than the ionization potential of the electron. When an electron on an outer orbital of the atom relaxes to fill the vacancy on the inner orbital, an X-ray (fluorescent X-ray or secondary X-ray) is emitted. The emitted X-ray has a photon energy equal the energy difference between the outer orbital and inner orbital electrons.

For a given atom, the number of possible relaxations is limited. As shown in FIG. 1A, when an electron on the L orbital relaxes to fill a vacancy on the K orbital (L→K), the fluorescent X-ray is called Kα. The fluorescent X-ray from M→K relaxation is called Kβ. As shown in FIG. 1B, the fluorescent X-ray from M→L relaxation is called Lα, and so on.

Analyzing the fluorescent X-ray spectrum can identify the elements in a sample because each element has orbitals of characteristic energy. The fluorescent X-ray can be analyzed either by sorting the energies of the photons (energy-dispersive analysis) or by separating the wavelengths of the fluorescent X-ray (wavelength-dispersive analysis). The intensity of each characteristic energy peak is directly related to the amount of each element in the sample.

In one type of detector suitable for energy dispersive analysis of X-ray, when an X-ray photon incident on an absorption layer of the detector, it can ionize a large number of atoms in the absorption layer, with the amount of charge carriers produced being largely proportional to the energy of the X-ray photon. The charge carriers are collected and counted to determine the energy of the X-ray photon. A spectrum may be compiled based on the number of X-ray photons as a function of their energy.

Other types of radiation (e.g., gamma ray) can also be used for elemental analysis of a sample by causing fluorescence in the sample, in a similar fashion.

SUMMARY

Disclosed herein is a detector, comprising: a plurality of strip pixels, wherein each of the strip pixel is configured to count numbers of radiation photons incident thereon whose energy falls in a plurality of bins, within a period of time.

According to an embodiment, the strip pixels are arranged in an array.

According to an embodiment, the strip pixels are configured to receive radiation photons from a sidewall of an absorption layer of the detector.

According to an embodiment, the detector is further configured to add the numbers of radiation photons for the bins of the same energy range counted by all the strip pixels.

According to an embodiment, each of the strip pixels of the detector comprises an analog-to-digital converter (ADC) configured to digitize an analog signal representing the energy of an incident X-ray photon into a digital signal.

According to an embodiment, the strip pixels are configured to operate in parallel.

According to an embodiment, the detector further comprises: a radiation absorption layer comprising the strip pixels, the strip pixels comprising an electric contact; a first voltage comparator configured to compare a voltage of the electric contact to a first threshold; a second voltage comparator configured to compare the voltage to a second threshold; a controller; a plurality of counters each associated with a bin and configured to register a number of radiation photons absorbed by one of the strip pixels wherein the energy of the radiation photons falls in the bin; wherein the controller is configured to start a time delay from a time at which the first voltage comparator determines that an absolute value of the voltage equals or exceeds an absolute value of the first threshold; wherein the controller is configured to determine whether an energy of a radiation photon falls into the bin; wherein the controller is configured to cause the number registered by the counter associated with the bin to increase by one.

According to an embodiment, the detector further comprises a capacitor module electrically connected to the electric contact, wherein the capacitor module is configured to collect charge carriers from the electric contact.

According to an embodiment, the controller is configured to activate the second voltage comparator at a beginning or expiration of the time delay.

According to an embodiment, the controller is configured to connect the electric contact to an electrical ground.

According to an embodiment, a rate of change of the voltage is substantially zero at expiration of the time delay.

According to an embodiment, the radiation absorption layer comprises silicon, GaAs, CdTe, CdZnTe, or a combination thereof.

Disclosed herein is a system comprising a detector described above, and a radiation source, wherein the system is configured to perform radiation radiography on human chest or abdomen.

Disclosed herein is a system comprising a detector described above, and a radiation source, wherein the system is configured to perform radiation radiography on human teeth.

Disclosed herein is a cargo scanning or non-intrusive inspection (NII) system, comprising the detector described above, and a radiation source, wherein the cargo scanning or non-intrusive inspection (NII) system is configured to identify elements by energy dispersive analysis using radiation transmitted through an object inspected.

Disclosed herein is a cargo scanning or non-intrusive inspection (NII) system, comprising the detector described above, and a high-energy X-ray source, or gamma ray source, wherein the cargo scanning or non-intrusive inspection (NII) system is configured to identify elements by energy dispersive analysis using backscattered radiation.

Disclosed herein is a full-body scanner system comprising the detector described above, and a radiation source, wherein the full-body scanner is configured to identify elements.

Disclosed herein is a method comprising: exposing a detector with a plurality of strip pixels to a radiation, wherein the radiation incidents on a sidewall of the strip pixels; determining a number of radiation photons for each strip pixel for one of a plurality of bins, wherein energy of the radiation photon falls in the one bin; and compiling the numbers of radiation photons as an energy spectrum of the radiation photons.

DETAILED DESCRIPTION

Figure 1A:
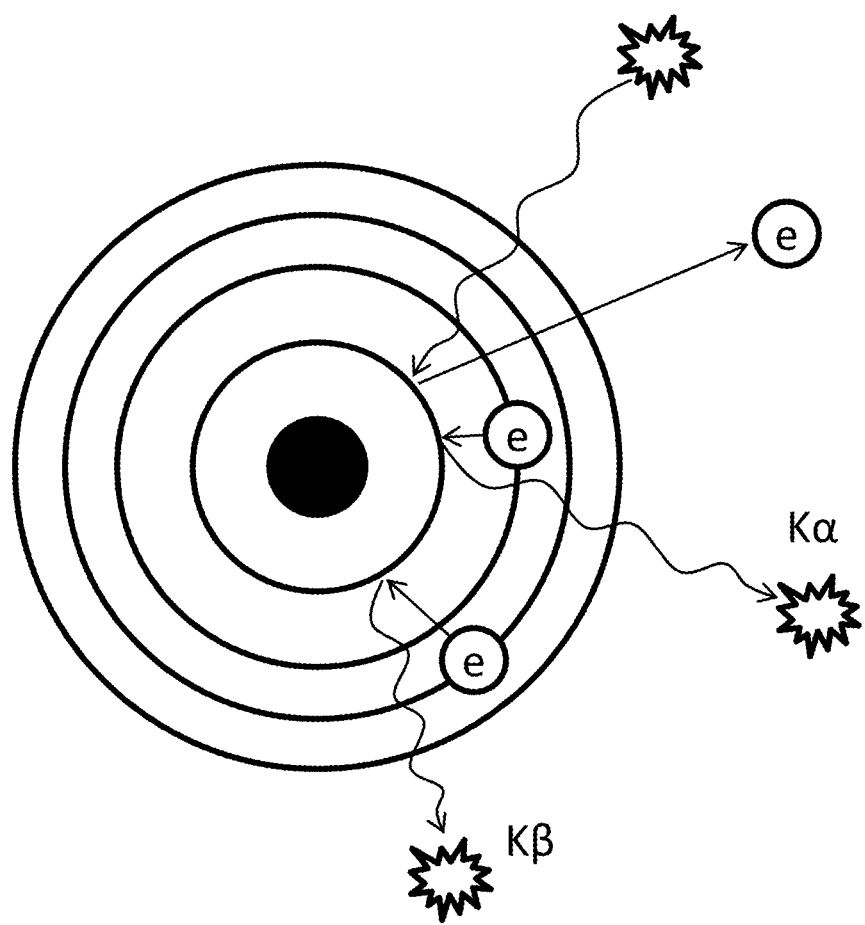
FIG. 1A and FIG. 1B schematically show mechanisms of XRF.
Figure 1B:
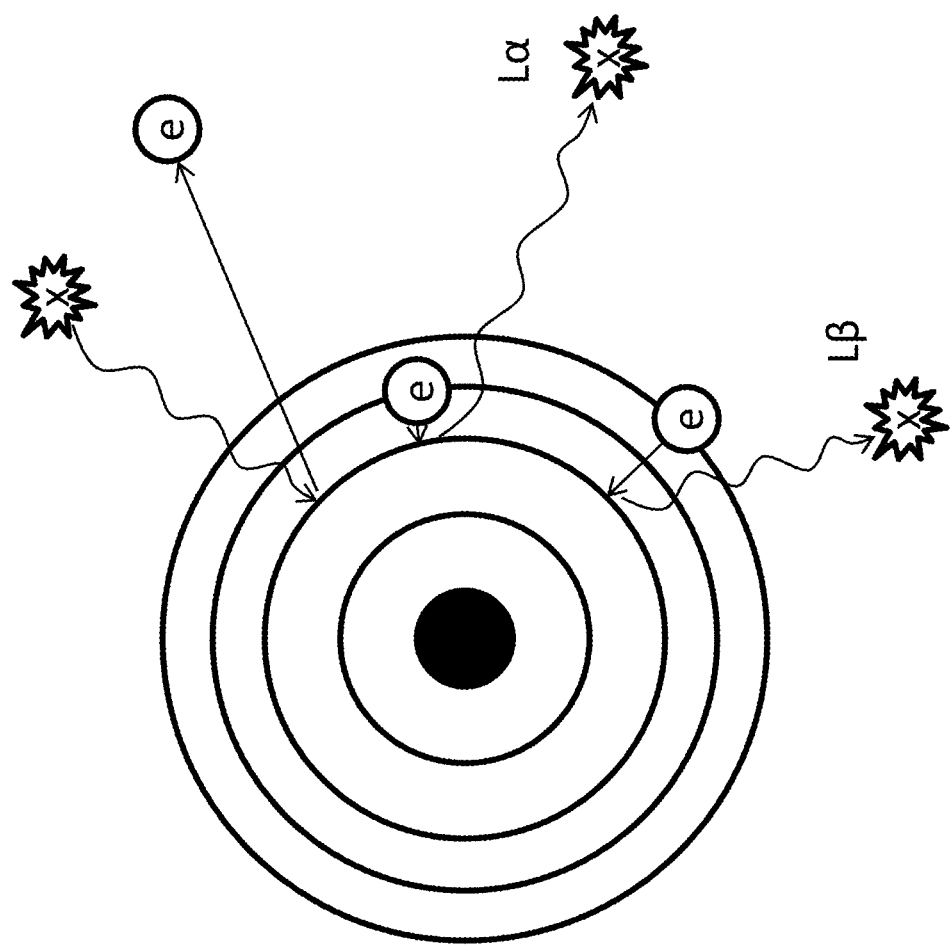
Figure 2A:
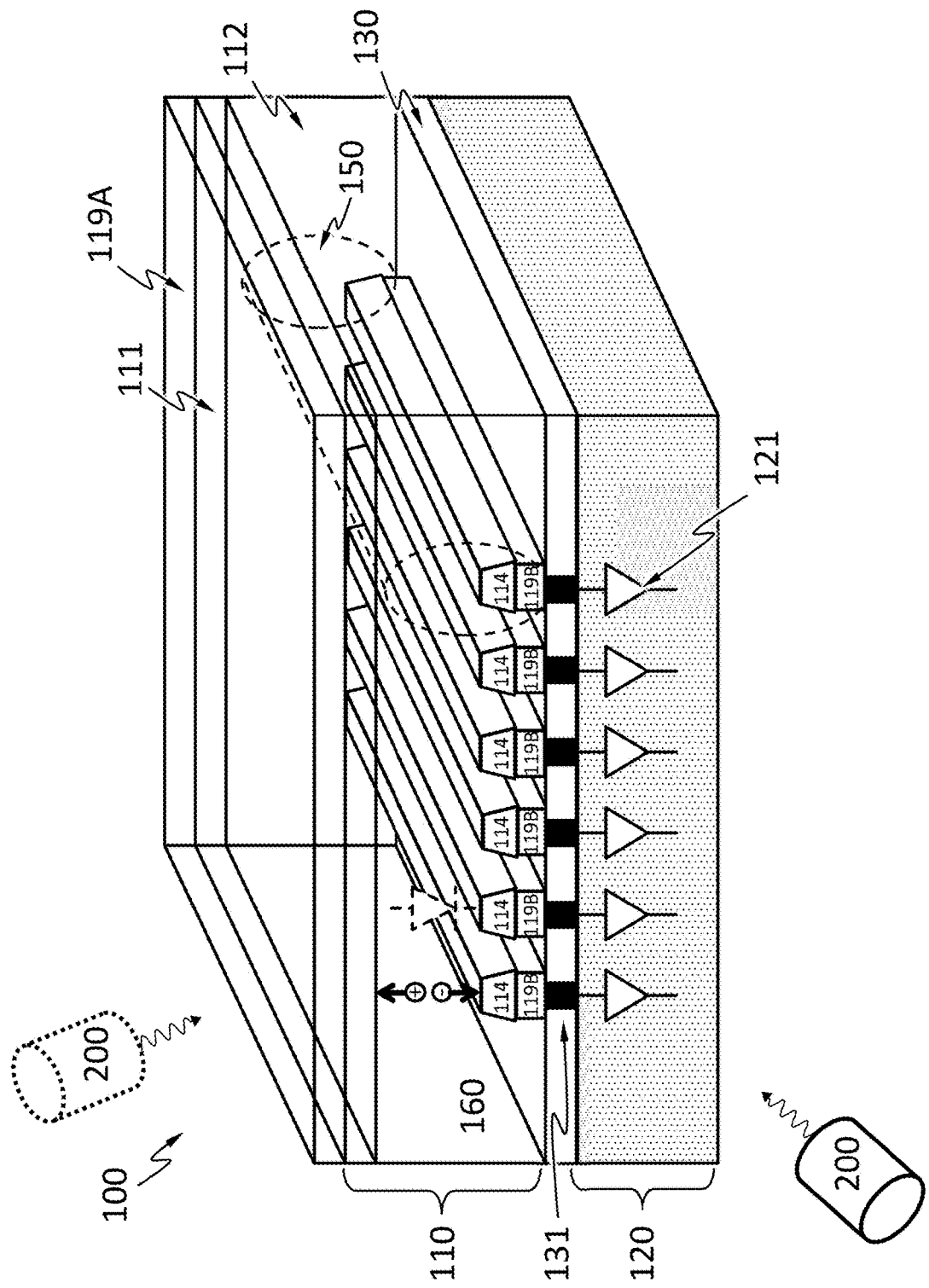
FIG. 2A schematically shows a detailed cross-sectional view of a detector.

FIG. 2A schematically shows a detector 100, according to an embodiment. The detector may include a radiation absorption layer 110 and an electronics layer 120 (e.g., an ASIC) for processing or analyzing electrical signals generated in the radiation absorption layer. The radiation absorption layer 110 comprises a plurality of semiconductor strips, each of which comprises an electric contact 119B and a discrete region 114 shown in FIG. 2A. The plurality of semiconductor strips may be arranged parallel with one another, or any other suitable patterns. The detector 100 may have an "edge-on" configuration, wherein the detector 100 is configured to receive radiation from a radiation source 200 at a sidewall 160 of the radiation absorption layer 110. The "sidewall" of the radiation absorption layer 110 is a surface of the radiation absorption layer 110, where the surface traverses the semiconductor strips. In the edge-on configuration, radiation incident on the sidewall propagate in the radiation absorption layer 110 roughly along the longitudinal direction of the semiconductor strips, and is absorbed by the radiation absorption layer 110 along the way. This configuration is helpful in increasing radiation absorption efficiency because the radiation can propagate in and be absorbed by the radiation absorption layer 110 along a length of millimeters or more. The detector 100 may be in a configuration other than the edge-on configuration, wherein the detector 100 is configured to receive radiation from the radiation source 200 not at the sidewall 160 of the radiation absorption layer 110.

The detector 100 may have a plurality of "strip pixels" 150. A strip pixel 150 comprises a semiconductor strip and a portion of the radiation absorption layer 110 around the semiconductor strip, where substantially all (more than 98%, more than 99.5%, more than 99.9%, or more than 99.99% of) charge carriers generated by a radiation photon absorbed by the portion flow to that semiconductor strip. Each strip pixel 150 is configured to detect a radiation photon incident on a portion of the sidewall of the radiation absorption layer 110. For example, each strip pixel 150 is configured to count numbers of radiation photons incident on the portion of the sidewall of the radiation absorption layer 110 whose energy falls in a plurality of bins, within a period of time. All the strip pixels 150 may be configured to count the numbers of radiation photons incident on the portion of the sidewall of the radiation absorption layer 110 within a plurality of bins of energy within the same period of time. Each strip pixel 150 may have its own analog-to-digital converter (ADC) configured to digitize an analog signal representing the energy of an incident radiation photon into a digital signal. The strip pixels 150 may be configured to operate in parallel. For example, when one strip pixel 150 measures an incident radiation photon, another strip pixel 150 may be waiting for a radiation photon to arrive. The strip pixels 150 may not have to be individually addressable.

The detector 100 may have at least 100, 500, 1000, or more strip pixels. The detector 100 may be configured to add the numbers of radiation photons for the bins of the same energy range counted by all the strip pixels. For example, the detector 100 may add the numbers the strip pixels stored in a bin for energy from 20 KeV to 21 KeV, add the numbers the strip pixels stored in a bin for energy from 21 KeV to 22 KeV, and so on. The detector 100 may compile the added numbers for the bins as a spectrum of the radiation photons incident on the detector 100.

As shown in a detailed cross-sectional view of the detector 100 in FIG. 2A, according to an embodiment, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional the intrinsic region 112. The discrete regions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 2A, each of the discrete regions 114 of the second doped region 113 forms a diode with the first doped region 111 and the optional intrinsic region 112. Namely, in the example in FIG. 2B, the radiation absorption layer 110 has a plurality of diodes having the first doped region 111 as a shared electrode. The first doped region 111 may also have discrete portions.

When a radiation photon hits the radiation absorption layer 110 including diodes, the radiation photon may be absorbed and generate one or more charge carriers by a number of mechanisms. A radiation photon may generate 10 to 100000 charge carriers. The charge carriers may drift to the electrodes of one of the diodes under an electric field. The field may be an external electric field. The electric contact 119B may include discrete portions each of which is in electric contact with the discrete regions 114.

Figure 2B:
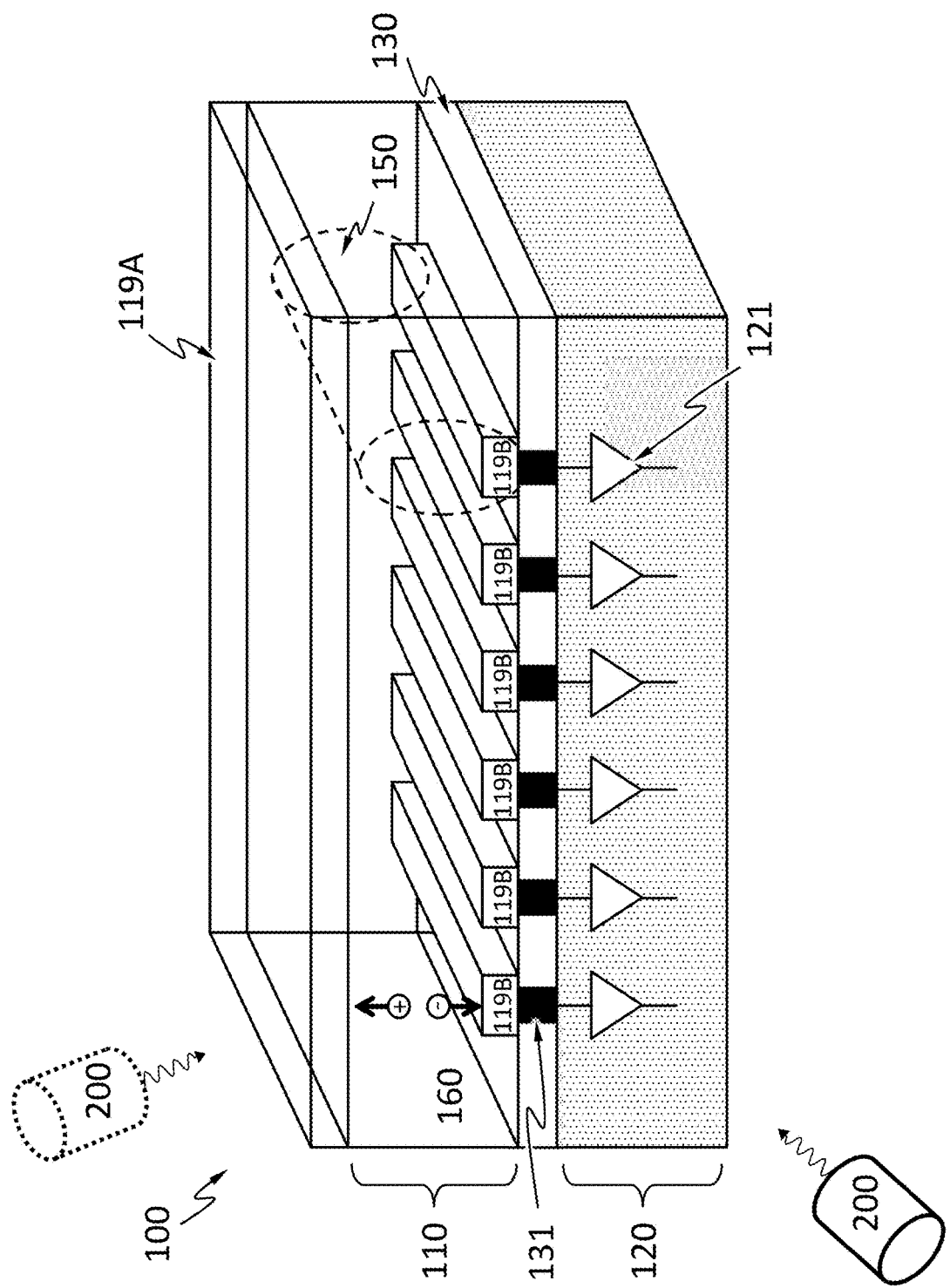
FIG. 2B schematically shows an alternative detailed cross-sectional view of the detector.

As shown in an alternative detailed cross-sectional view of the detector 100 in FIG. 2B, according to an embodiment, the radiation absorption layer 110 may include a resistor of a semiconductor material such as, silicon, GaAs, CdTe, CdZnTe, or a combination thereof, but does not include a diode. The semiconductor may have a high mass attenuation coefficient for the radiation of interest.

When a radiation photon hits the radiation absorption layer 110 including a resistor but not diodes, it may be absorbed and generate one or more charge carriers by a number of mechanisms. A radiation photon may generate 10 to 100000 charge carriers. The charge carriers may drift to the electric contacts 119A and 119B under an electric field. The field may be an external electric field. The electric contact 119B includes discrete portions.

The electronics layer 120 may include an electronic system 121, suitable for processing or interpreting signals generated by radiation photons absorbed by the radiation absorption layer 110. The electronic system 121 may include an analog circuitry such as a filter network, amplifiers, integrators, and comparators, or a digital circuitry such as a microprocessor, and memory. The electronic system 121 may include components shared by the strip pixels or components dedicated to a single strip pixel. For example, the electronic system 121 may include an amplifier dedicated to each strip pixel and a microprocessor shared among all the strip pixels. The electronic system 121 may be electrically connected to the strip pixels by vias 131. Space among the vias may be filled with a filler material 130, which may increase the mechanical stability of the connection of the electronics layer 120 to the radiation absorption layer 110. Other bonding techniques are possible to connect the electronic system 121 to the strip pixels without using vias. For example, the electronics layer 120 including the electronic system 121 may be in a substrate positioned side by side with the radiation absorption layer 110 and the strip pixels may be connected to the electronic system 121 by wire bonding.

Figure 3:
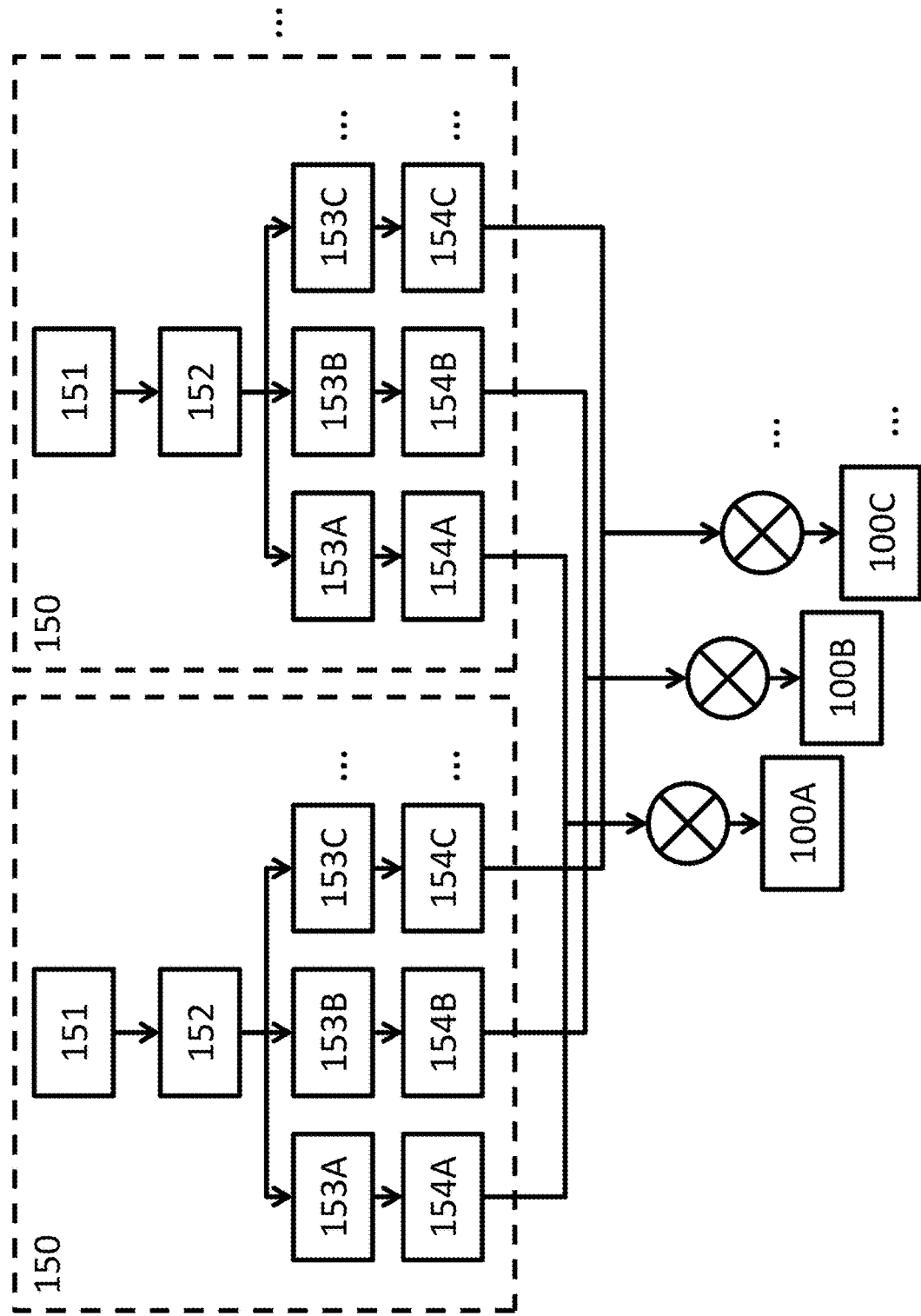
FIG. 3 schematically shows a functional block diagram for the detector, according to an embodiment.

FIG. 3 schematically shows a block diagram for the detector 100, according to an embodiment. In step 151, each strip pixel 150 may measure the energy of a radiation photon it absorbs. The energy of the radiation photon is digitized (e.g., by an ADC) in step 152 into one of a plurality of bins 153A, 153B, 153C . . . . The bins 153A, 153B, 153C . . . each have a corresponding counter 154A, 154B and 154C, respectively. When the energy is allocated into a bin, the number stored in the corresponding counter increases by one. The detector 100 may added the numbers stored in all the counters corresponding to bins for the same energy range in the strip pixels 150. For example, the numbers stored in all the counters 154C in all strip pixels 150 may be added and stored in a global counter 100C for the same energy range. The numbers stored in all the global counters may be compiled into an energy spectrum of the radiation incident on the detector 100.

Figure 4A:
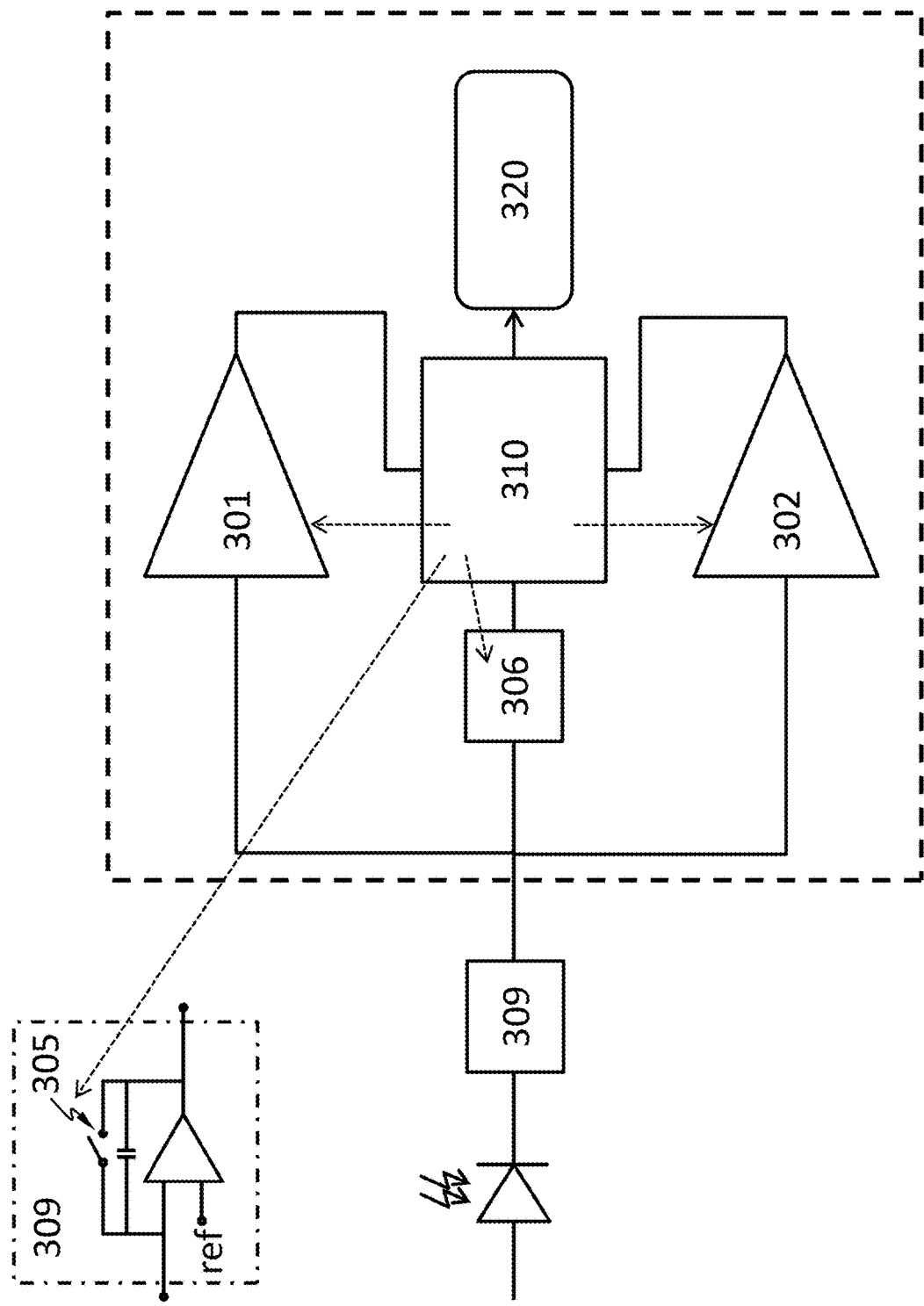
FIG. 4A and FIG. 4B each show a component diagram of the electronic system of the detector, according to an embodiment.
Figure 4B:
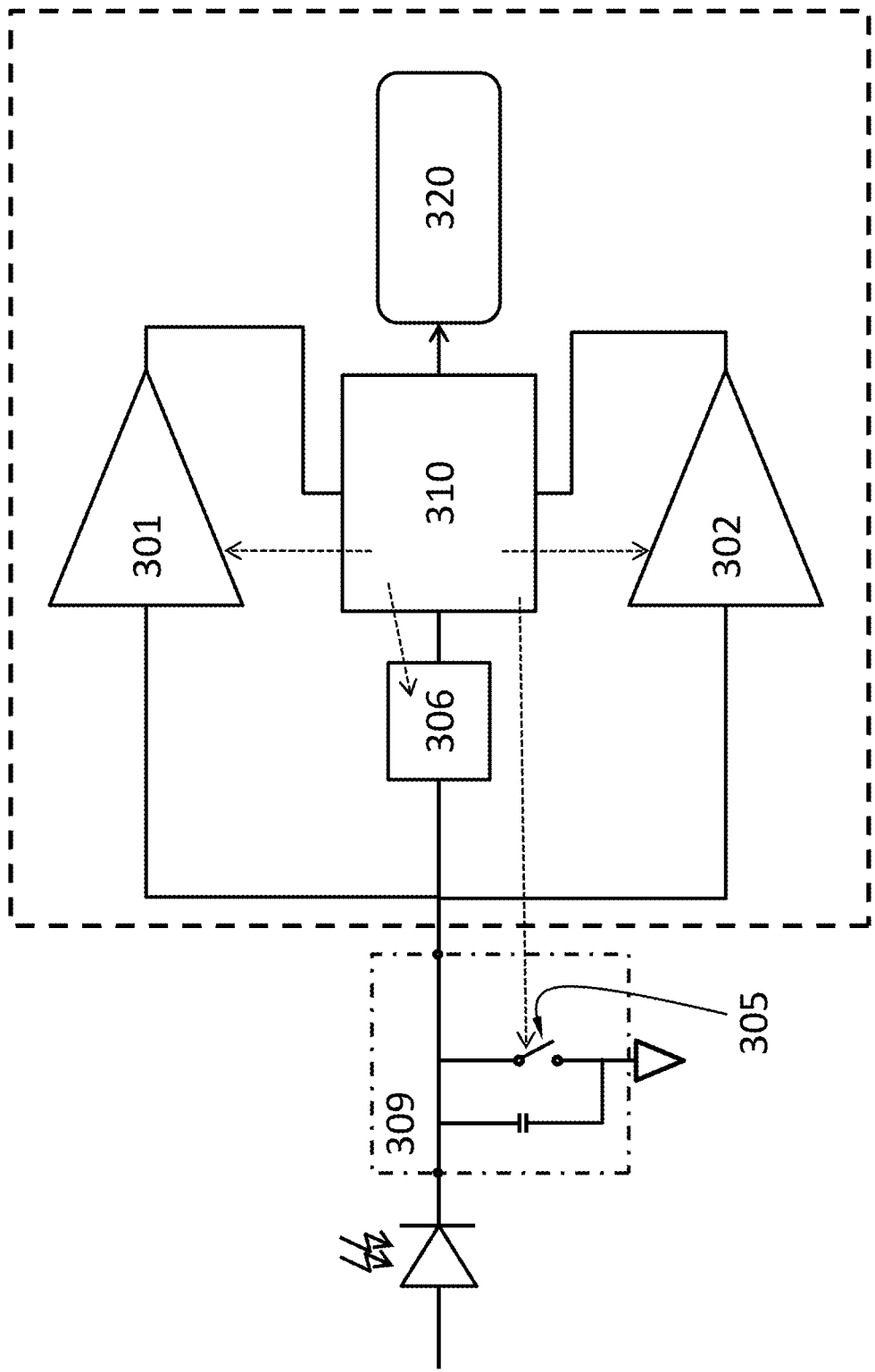

FIG. 4A and FIG. 4B each show a component diagram of the electronic system 121, according to an embodiment. The electronic system 121 may include a first voltage comparator 301, a second voltage comparator 302, a plurality of counters 320 (including counters 320A, 320B, 320C, 320D . . . ), a switch 305, an ADC 306 and a controller 310.

The first voltage comparator 301 is configured to compare the voltage of a discrete portion of the electric contact 119B to a first threshold. The first voltage comparator 301 may be configured to monitor the voltage directly, or calculate the voltage by integrating an electric current flowing through the diode or electric contact over a period of time. The first voltage comparator 301 may be controllably activated or deactivated by the controller 310. The first voltage comparator 301 may be a continuous comparator. Namely, the first voltage comparator 301 may be configured to be activated continuously, and monitor the voltage continuously. The first voltage comparator 301 configured as a continuous comparator reduces the chance that the system 121 misses signals generated by an incident radiation photon. The first voltage comparator 301 configured as a continuous comparator is especially suitable when the incident radiation intensity is relatively high. The first voltage comparator 301 may be a clocked comparator, which has the benefit of lower power consumption. The first voltage comparator 301 configured as a clocked comparator may cause the system 121 to miss signals generated by some incident radiation photons. When the incident radiation intensity is low, the chance of missing an incident radiation photon is low because the time interval between two successive photons is relatively long. Therefore, the first voltage comparator 301 configured as a clocked comparator is especially suitable when the incident radiation intensity is relatively low. The first threshold may be 1-5%, 5-10%, 10%-20%, 20-30%, 30-40% or 40-50% of the maximum voltage one incident radiation photon may generate on the electric contact 119B. The maximum voltage may depend on the energy of the incident radiation photon (i.e., the wavelength of the incident radiation), the material of the radiation absorption layer 110, and other factors. For example, the first threshold may be 50 mV, 100 mV, 150 mV, or 200 mV.

The second voltage comparator 302 is configured to compare the voltage to a second threshold. The second voltage comparator 302 may be configured to monitor the voltage directly, or calculate the voltage by integrating an electric current flowing through the diode or the electric contact over a period of time. The second voltage comparator 302 may be a continuous comparator. The second voltage comparator 302 may be controllably activate or deactivated by the controller 310. When the second voltage comparator 302 is deactivated, the power consumption of the second voltage comparator 302 may be less than 1%, less than 5%, less than 10% or less than 20% of the power consumption when the second voltage comparator 302 is activated. The absolute value of the second threshold is greater than the absolute value of the first threshold. As used herein, the term "absolute value" or "modulus" |x| of a real number x is the non-negative value of x without regard to its sign. Namely, $$|x| = \begin{cases} x, & \text{if } x \geq 0 \\ -x, & \text{if } x \leq 0 \end{cases}.$$

The second threshold may be 200%-300% of the first threshold. For example, the second threshold may be 100 mV, 150 mV, 200 mV, 250 mV or 300 mV. The second voltage comparator 302 and the first voltage comparator 310 may be the same component. Namely, the system 121 may have one voltage comparator that can compare a voltage with two different thresholds at different times.

The first voltage comparator 301 or the second voltage comparator 302 may include one or more op-amps or any other suitable circuitry. The first voltage comparator 301 or the second voltage comparator 302 may have a high speed to allow the system 121 to operate under a high flux of incident radiation. However, having a high speed is often at the cost of power consumption.

The counters 320 may be a software component (e.g., numbers stored in a computer memory) or a hardware component (e.g., 4017 IC and 7490 IC). Each counter 320 is associated with a bin for an energy range. For example, counter 320A may be associated with a bin for 70-71 KeV, counter 320B may be associated with a bin for 71-72 KeV, counter 320C may be associated with a bin for 72-73 KeV, counter 320D may be associated with a bin for 73-74 KeV. When the energy of an incident radiation photon is determined by the ADC 306 to be in the bin a counter 320 is associated with, the number registered in the counter 320 is increased by one.

The controller 310 may be a hardware component such as a microcontroller and a microprocessor. The controller 310 is configured to start a time delay from a time at which the first voltage comparator 301 determines that the absolute value of the voltage equals or exceeds the absolute value of the first threshold (e.g., the absolute value of the voltage increases from below the absolute value of the first threshold to a value equal to or above the absolute value of the first threshold). The absolute value is used here because the voltage may be negative or positive, depending on whether the voltage of the cathode or the anode of the diode or which electric contact is used. The controller 310 may be configured to keep deactivated the second voltage comparator 302, the counter 320 and any other circuits the operation of the first voltage comparator 301 does not require, before the time at which the first voltage comparator 301 determines that the absolute value of the voltage equals or exceeds the absolute value of the first threshold. The time delay may expire after the voltage becomes stable, i.e., the rate of change of the voltage is substantially zero. The phase "the rate of change is substantially zero" means that temporal change is less than 0.1%/ns. The phase "the rate of change is substantially non-zero" means that temporal change of the voltage is at least 0.1%/ns.

The controller 310 may be configured to activate the second voltage comparator during (including the beginning and the expiration) the time delay. In an embodiment, the controller 310 is configured to activate the second voltage comparator at the beginning of the time delay. The term "activate" means causing the component to enter an operational state (e.g., by sending a signal such as a voltage pulse or a logic level, by providing power, etc.). The term "deactivate" means causing the component to enter a non-operational state (e.g., by sending a signal such as a voltage pulse or a logic level, by cut off power, etc.). The operational state may have higher power consumption (e.g., 10 times higher, 100 times higher, 1000 times higher) than the non-operational state. The controller 310 itself may be deactivated until the output of the first voltage comparator 301 activates the controller 310 when the absolute value of the voltage equals or exceeds the absolute value of the first threshold.

The controller 310 may be configured to cause the number registered by one of the counters 320 to increase by one, if, during the time delay, the second voltage comparator 302 determines that the absolute value of the voltage equals or exceeds the absolute value of the second threshold, and the energy of the radiation photon falls in the bin associated with the counter 320.

The controller 310 may be configured to cause the ADC 306 to digitize the voltage upon expiration of the time delay and determine based on the voltage which bin the energy of the radiation photon falls in.

The controller 310 may be configured to connect the electric contact 119B to an electrical ground, so as to reset the voltage and discharge any charge carriers accumulated on the electric contact 119B. In an embodiment, the electric contact 119B is connected to an electrical ground after the expiration of the time delay. In an embodiment, the electric contact 119B is connected to an electrical ground for a finite reset time period. The controller 310 may connect the electric contact 119B to the electrical ground by controlling the switch 305. The switch may be a transistor such as a field-effect transistor (FET).

In an embodiment, the system 121 has no analog filter network (e.g., a RC network). In an embodiment, the system 121 has no analog circuitry.

The ADC 306 may feed the voltage it measures to the controller 310 as an analog or digital signal. The ADC may be a successive-approximation-register (SAR) ADC (also called successive approximation ADC). An SAR ADC digitizes an analog signal via a binary search through all possible quantization levels before finally converging upon a digital output for the analog signal. An SAR ADC may have four main subcircuits: a sample and hold circuit to acquire the input voltage ($V_{in}$), an internal digital-analog converter (DAC) configured to supply an analog voltage comparator with an analog voltage equal to the digital code output of the successive approximation register (SAR), the analog voltage comparator that compares $V_{in}$ to the output of the internal DAC and outputs the result of the comparison to the SAR, the SAR configured to supply an approximate digital code of $V_{in}$ to the internal DAC. The SAR may be initialized so that the most significant bit (MSB) is equal to a digital 1. This code is fed into the internal DAC, which then supplies the analog equivalent of this digital code ($V_{ref}/2$) into the comparator for comparison with $V_{in}$. If this analog voltage exceeds $V_{in}$ the comparator causes the SAR to reset this bit; otherwise, the bit is left a 1. Then the next bit of the SAR is set to 1 and the same test is done, continuing this binary search until every bit in the SAR has been tested. The resulting code is the digital approximation of $V_{in}$ and is finally output by the SAR at the end of the digitization.

Figure 5:
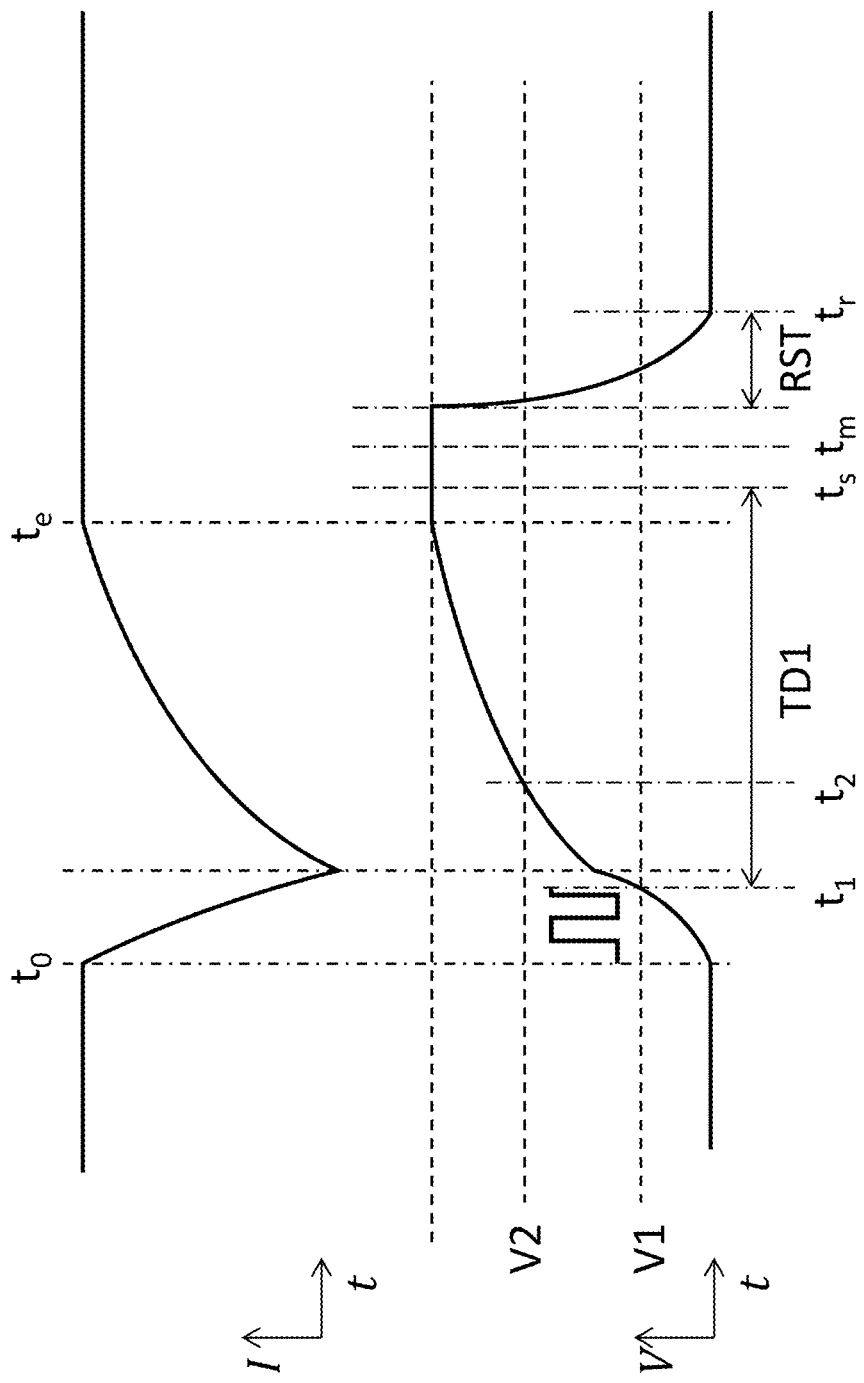
FIG. 5 schematically shows a temporal change of the electric current flowing through an electric contact (upper curve) caused by charge carriers generated by a radiation photon incident on a strip pixel associated with the electric contact, and a corresponding temporal change of the voltage of the electric contact (lower curve).

The system 121 may include a capacitor module 309 electrically connected to the electric contact 119B, wherein the capacitor module is configured to collect charge carriers from the electric contact 119B. The capacitor module can include a capacitor in the feedback path of an amplifier. The amplifier configured as such is called a capacitive transimpedance amplifier (CTIA). CTIA has high dynamic range by keeping the amplifier from saturating and improves the signal-to-noise ratio by limiting the bandwidth in the signal path. Charge carriers from the electrode accumulate on the capacitor over a period of time ("integration period") (e.g., as shown in FIG. 5, between $t_s$ to $t_0$). After the integration period has expired, the capacitor voltage is sampled by the ADC 306 and then reset by a reset switch. The capacitor module 309 can include a capacitor directly connected to the electric contact 119B.

Figure 6:
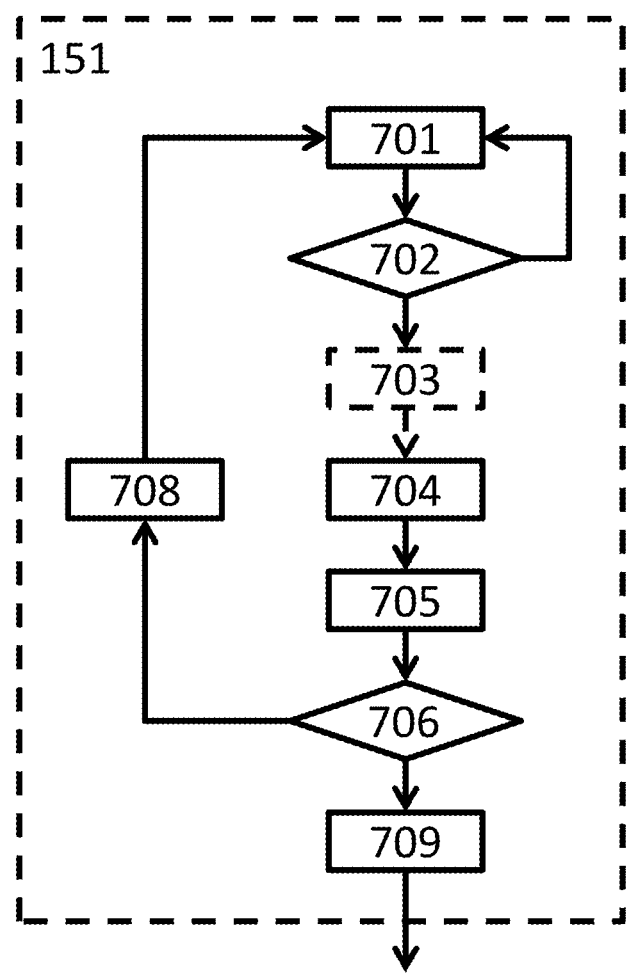
FIG. 6 shows an example flow chart for step 151 in FIG. 3, according to an embodiment.

FIG. 5 schematically shows a temporal change of the electric current flowing through the electric contact 119B (upper curve) caused by charge carriers generated by an radiation photon incident on the strip pixel 150 associated with the electric contact 119B, and a corresponding temporal change of the voltage of the electric contact 119B (lower curve). The voltage may be an integral of the electric current with respect to time. At time $t_0$, the radiation photon hits the diode or the resistor, charge carriers start being generated in the strip pixel 150, electric current starts to flow through the electric contact 119B, and the absolute value of the voltage of the electric contact 119B starts to increase. At time $t_1$, the first voltage comparator 301 determines that the absolute value of the voltage equals or exceeds the absolute value of the first threshold V1, and the controller 310 starts the time delay TD1 and the controller 310 may deactivate the first voltage comparator 301 at the beginning of TD1. If the controller 310 is deactivated before $t_1$, the controller 310 is activated at $t_1$. During TD1, the controller 310 activates the second voltage comparator 302. The term "during" a time delay as used here means the beginning and the expiration (i.e., the end) and any time in between. For example, the controller 310 may activate the second voltage comparator 302 at the expiration of TD1. If during TD1, the second voltage comparator 302 determines that the absolute value of the voltage equals or exceeds the absolute value of the second threshold at time $t_2$, the controller 310 waits for stabilization of the voltage to stabilize. The voltage stabilizes at time $t_e$, when all charge carriers generated by the radiation photon drift out of the radiation absorption layer 110. At time $t_s$, the time delay TD1 expires. At or after time $t_e$, the controller 310 causes the ADC 306 to digitize the voltage and determines which bin the energy of the radiation photons falls in. The controller 310 then causes the number registered by the counter 320 corresponding to the bin to increase by one. In the example of FIG. 6, time $t_s$ is after time $t_e$; namely TD1 expires after all charge carriers generated by the radiation photon drift out of the radiation absorption layer 110. If time $t_e$ cannot be easily measured, TD1 can be empirically chosen to allow sufficient time to collect essentially all charge carriers generated by an radiation photon but not too long to risk have another incident radiation photon. Namely, TD1 can be empirically chosen so that time $t_s$ is empirically after time $t_e$. Time $t_s$ is not necessarily after time $t_e$ because the controller 310 may disregard TD1 once V2 is reached and wait for time $t_e$. The rate of change of the difference between the voltage and the contribution to the voltage by the dark current is thus substantially zero at $t_e$. The controller 310 may be configured to deactivate the second voltage comparator 302 at expiration of TD1 or at $t_2$, or any time in between.

The voltage at time $t_e$ is proportional to the amount of charge carriers generated by the radiation photon, which relates to the energy of the radiation photon. The controller 310 may be configured to determine the bin the energy of the radiation photon falls in, based on the output of the ADC 306.

After TD1 expires or digitization by the ADC 306, whichever later, the controller 310 connects the electric contact 119B to an electric ground for a reset period RST to allow charge carriers accumulated on the electric contact 119B to flow to the ground and reset the voltage. After RST, the system 121 is ready to detect another incident radiation photon. Implicitly, the rate of incident radiation photons the system 121 can handle in the example of FIG. 6 is limited by 1/(TD1+RST). If the first voltage comparator 301 has been deactivated, the controller 310 can activate it at any time before RST expires. If the controller 310 has been deactivated, it may be activated before RST expires.

Because the detector 100 has many strip pixels 150 that may operate in parallel, the detector can handle much higher rate of incident radiation photons. This is because the rate of incidence on a particular strip pixel 150 is 1/N of the rate of incidence on the entire array of strip pixels, where N is the number of strip pixels.

FIG. 6 shows an example flow chart for step 151 in FIG. 3, according to an embodiment. In step 701, compare, e.g., using the first voltage comparator 301, a voltage of an electric contact 119B of a diode or a resistor exposed to radiation photons (e.g., fluorescent X-ray), to the first threshold. In step 702, determine, e.g., with the controller 310, whether the absolute value of the voltage equals or exceeds the absolute value of the first threshold V1. If the absolute value of the voltage does not equal or exceed the absolute value of the first threshold, the method goes back to step 701. If the absolute value of the voltage equals or exceeds the absolute value of the first threshold, continue to step 703. In step 703, measure $T=(t_1-t_0)$. In step 704, start, e.g., using the controller 310, the time delay TD1. In step 705, compare, e.g., using the second voltage comparator 302, the voltage to the second threshold. In step 706, determine, e.g., using the controller 310, whether the absolute value of the voltage equals or exceeds the absolute value of the second threshold V2. If the absolute value of the voltage does not equal or exceed the absolute value of the second threshold, the method goes to step 708. In step 708, reset the voltage to an electrical ground, e.g., by connecting the electric contact 119B to an electrical ground. If the absolute value of the voltage equals or exceeds the absolute value of the second threshold, continue to step 709. In step 709, measure the voltage after it stabilizes, at time $t_m$, and subtract an contribution from a dark current to the measured voltage. Time $t_m$ can be any time after TD1 expires and before RST. The result is provided to ADC in step 152 in FIG. 3. The time when the reset period ends (e.g., the time when the electric contact 119B is disconnected from the electrical ground) is $t_r$.

Figure 7:
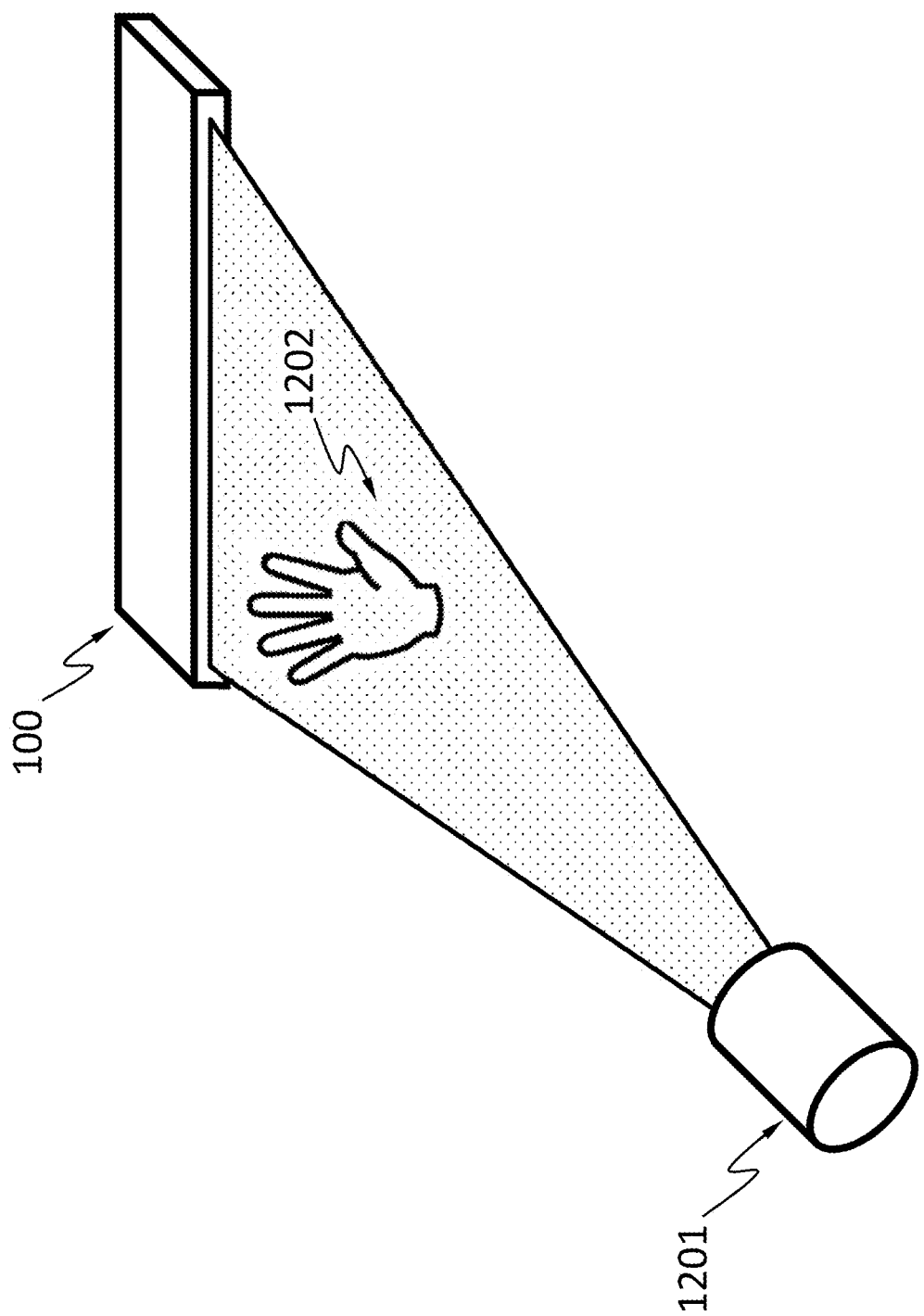
FIG. 7 schematically shows a system comprising the detector described herein, suitable for medical imaging such as chest X-ray radiography, abdominal X-ray radiography, etc., according to an embodiment.

FIG. 7 schematically shows a system comprising the detector 100 described herein. The system may be used for medical imaging such as chest X-ray radiography, abdominal X-ray radiography, etc. X-ray emitted from a radiation source 1201 penetrates an object 1202 (e.g., a human body part such as chest, limb, abdomen), is attenuated by different degrees by the internal structures of the object 1202 (e.g., bones, muscle, fat and organs, etc.), and is projected to the detector 100. The detector 100 forms an energy spectrum by detecting the intensity distribution of the radiation.

Figure 8:
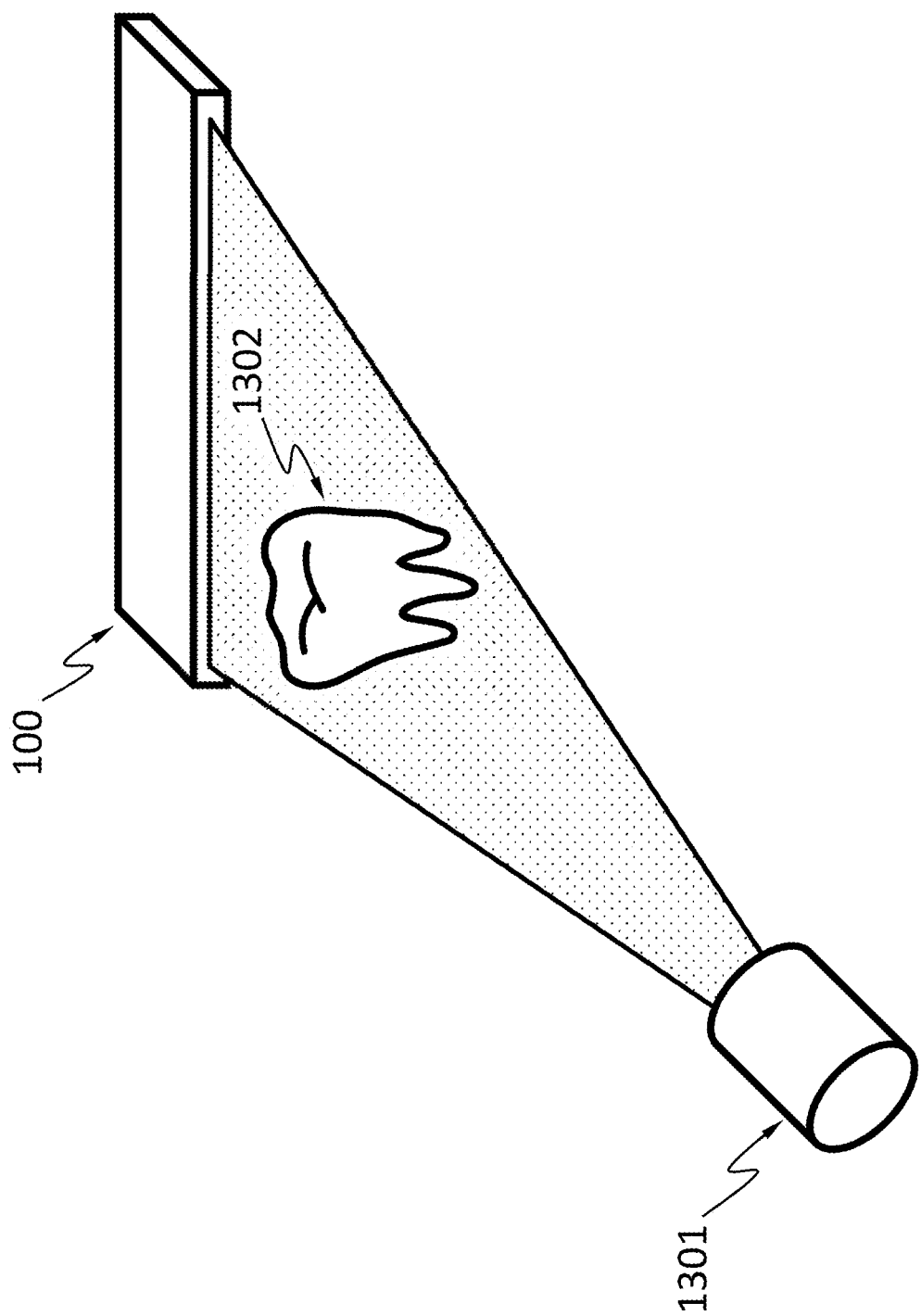
FIG. 8 schematically shows a system comprising the detector described herein suitable for dental X-ray radiography, according to an embodiment.

FIG. 8 schematically shows a system comprising the detector 100 described herein. The system may be used for medical imaging such as dental X-ray radiography. The system comprises a radiation source 1301. Radiation emitted from the radiation source 1301 penetrates an object 1302 that is part of a mammal (e.g., human) mouth. The object 1302 may include a maxilla bone, a palate bone, a tooth, the mandible, or the tongue. The radiation is attenuated by different degrees by the different structures of the object 1302 and is projected to the detector 100. The detector 100 forms an energy spectrum by detecting the intensity distribution of the radiation. Teeth absorb radiation more than dental caries, infections, periodontal ligament. The dosage of radiation received by a dental patient is typically small (around 0.150 mSv for a full mouth series).

Figure 9:
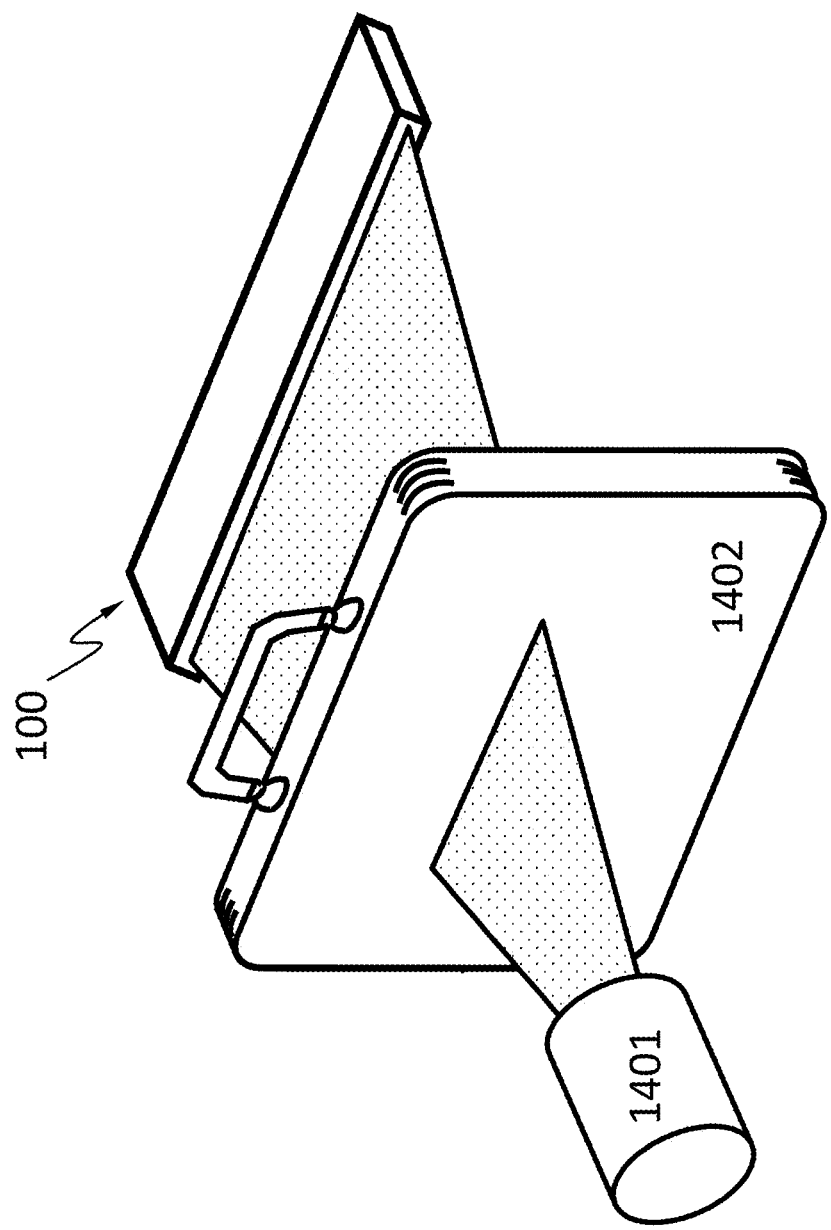
FIG. 9 schematically shows a cargo scanning or non-intrusive inspection (NII) system comprising the detector described herein, according to an embodiment.

FIG. 9 schematically shows a cargo scanning or non-intrusive inspection (NII) system comprising the detector 100 described herein. The system may be used for luggage screening at public transportation stations and airports. The system comprises a radiation source 1401. Radiation emitted from the radiation source 1401 may penetrate a piece of luggage 1402, be differently attenuated by the contents of the luggage, and projected to the detector 100. The detector 100 forms an energy spectrum by detecting the intensity distribution of the transmitted radiation. The system may reveal contents and element composition of luggage and identify items forbidden on public transportation, such as firearms, narcotics, edged weapons, flammables.

Figure 10:
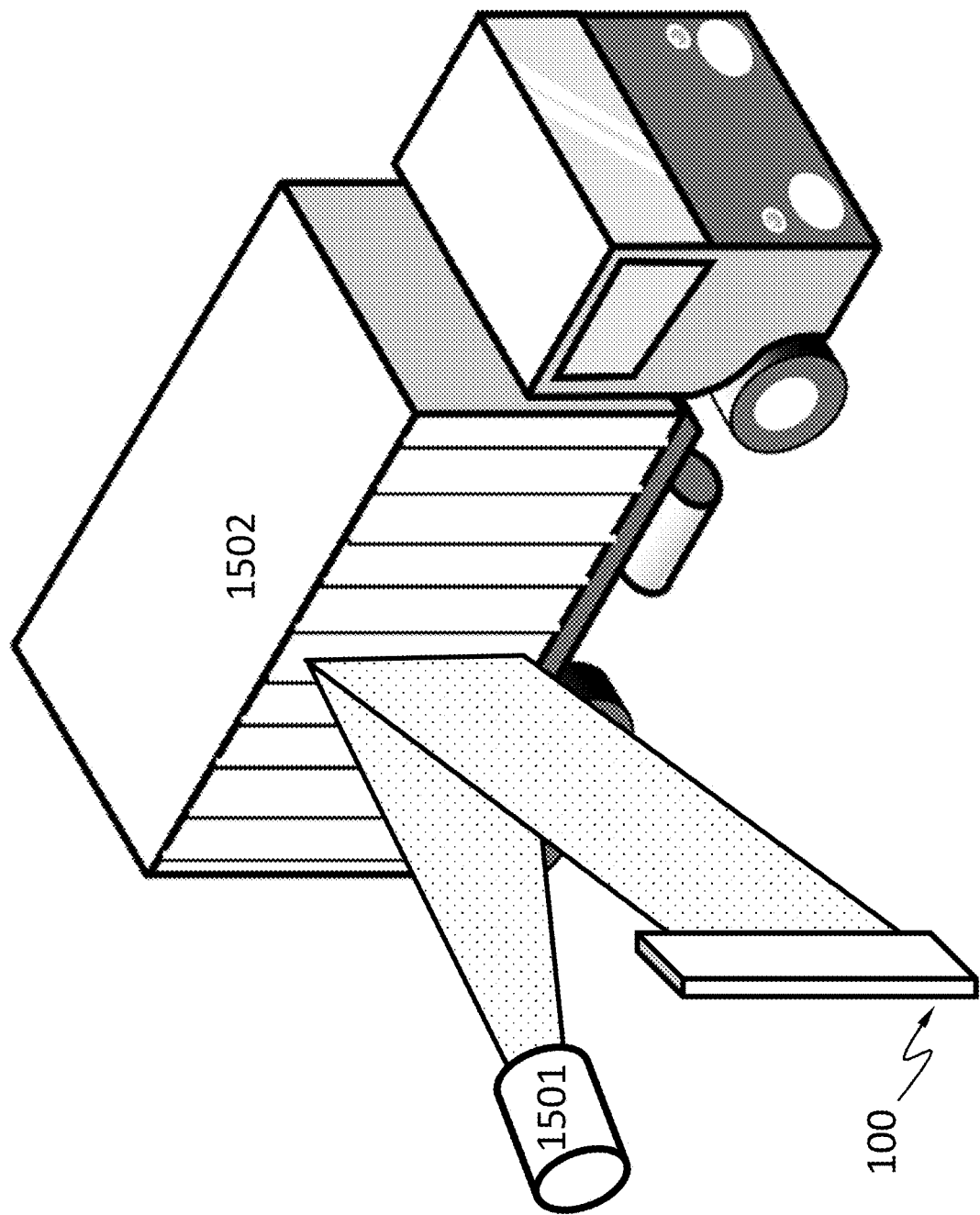
FIG. 10 schematically shows another cargo scanning or non-intrusive inspection (NII) system comprising the detector described herein and a high-energy radiation source, according to an embodiment.

FIG. 10 schematically shows another cargo scanning or non-intrusive inspection (NII) system comprising the detector 100 described herein. The system may be used for inspecting and identifying goods in transportation systems such as shipping containers, vehicles, ships, luggage, etc. The system may comprise a high-energy X-ray or gamma ray radiation source 1501, and the detector may comprise an absorption layer comprising CdTe, CdZnTe, or a combination thereof. Radiation emitted from the radiation source 1501 may backscatter from an object 1502 (e.g., shipping containers, vehicles, ships, etc.) and be projected to the detector 100. Different internal structures and composition of the object 1502 may backscatter the radiation differently. The detector 100 forms energy spectra by detecting the intensity distribution of the backscattered radiation and/or energies of the backscattered radiation.

Figure 11:
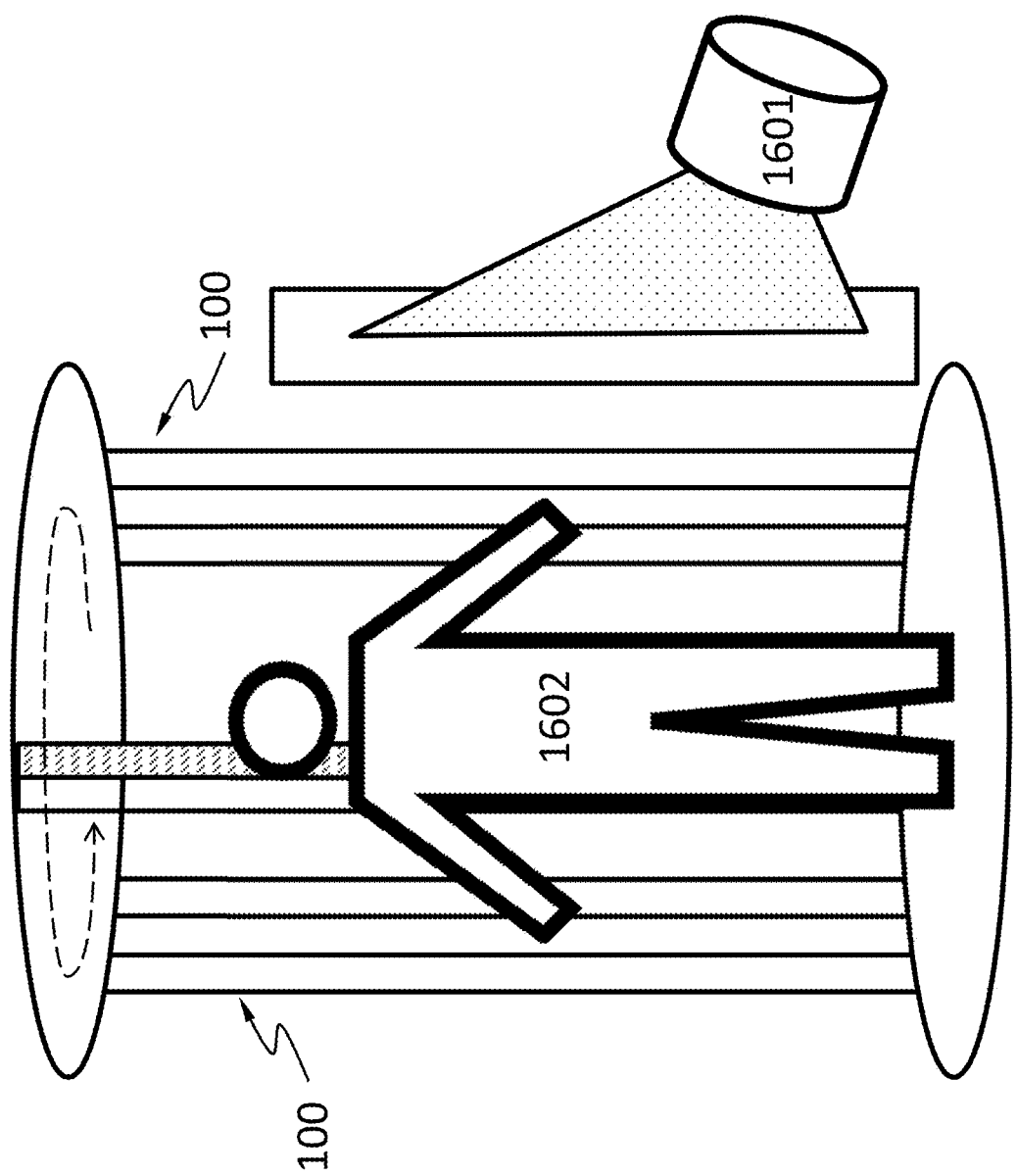
FIG. 11 schematically shows a full-body scanner system comprising a plurality of the detectors described herein, according to an embodiment.

FIG. 11 schematically shows a full-body scanner system comprising a plurality of the detectors 100 described herein. The full-body scanner system may detect objects on a person's body for security screening purposes, without physically removing clothes or making physical contact. The full-body scanner system may be able to detect non-metal objects. The full-body scanner system comprises several collimated radiation sources 1601 on the side. The collimated radiation emitted from the pulsed radiation source 1601 may backscatter from or penetrate through a human body 1602 being screened and objects thereon, and be detected by the detector 100. The objects and the human body may backscatter or attenuate the radiation differently. The detectors 100 can analyze the object element compositions by detecting the intensity distribution of the backscattered or transmitted radiation.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A detector, comprising:
a plurality of strip pixels, wherein each of the strip pixels is configured to count numbers of radiation photons incident thereon whose energy falls in a plurality of bins, within a period of time;
wherein the detector further comprises:
a radiation absorption layer comprising the strip pixels, the strip pixels comprising an electric contact;
a first voltage comparator configured to compare a voltage of the electric contact to a first threshold;
a second voltage comparator configured to compare the voltage to a second threshold;
a controller;
a plurality of counters each associated with a bin and configured to register a number of radiation photons absorbed by one of the strip pixels wherein the energy of the radiation photons falls in the bin;
wherein the controller is configured to start a time delay from a time at which the first voltage comparator determines that an absolute value of the voltage equals or exceeds an absolute value of the first threshold;
wherein the controller is configured to determine whether an energy of a radiation photon falls into the bin;
wherein the controller is configured to cause the number registered by the counter associated with the bin to increase by one.

2. The detector of claim 1, wherein the strip pixels are arranged in an array.

3. The detector of claim 1, wherein the strip pixels are configured to receive radiation photons from a sidewall of an absorption layer of the detector.

4. The detector of claim 1, wherein the detector is further configured to add the numbers of radiation photons for the bins of the same energy range counted by all the strip pixels.

5. The detector of claim 1, wherein each of the strip pixels comprises an analog-to-digital converter (ADC) configured to digitize an analog signal representing the energy of an incident radiation photon into a digital signal.

6. The detector of claim 1, wherein the strip pixels are configured to operate in parallel.

7. The detector of claim 1, further comprising a capacitor module electrically connected to the electric contact, wherein the capacitor module is configured to collect charge carriers from the electric contact.

8. The detector of claim 1, wherein the controller is configured to activate the second voltage comparator at a beginning or expiration of the time delay.

9. The detector of claim 1, wherein the controller is configured to connect the electric contact to an electrical ground.

10. The detector of claim 1, wherein a rate of change of the voltage is substantially zero at expiration of the time delay.

11. The detector of claim 1, wherein the radiation absorption layer comprises silicon, GaAs, CdTe, CdZnTe, or a combination thereof.

12. A system comprising the detector of claim 1, and a radiation source, wherein the system is configured to perform radiation radiography on human chest or abdomen.

13. A system comprising the detector of claim 1, and a radiation source, wherein the system is configured to perform radiation radiography on human teeth.

14. A cargo scanning or non-intrusive inspection (NII) system, comprising the detector of claim 1, and a radiation source, wherein the cargo scanning or non-intrusive inspection (NII) system is configured to identify elements by energy dispersive analysis using radiation transmitted through an object inspected.

15. A cargo scanning or non-intrusive inspection (NII) system, comprising the detector of claim 1, and a high-energy X-ray source, or gamma ray source, wherein the cargo scanning or non-intrusive inspection (NII) system is configured to identify elements by energy dispersive analysis using backscattered radiation.

16. A full-body scanner system comprising the detector of claim 1, and a radiation source, wherein the full-body scanner is configured to identify elements.

* * * * *